Dec. 9, 1969  B. R. ANKERSEN  3,482,533
INCINERATORS
Filed June 28, 1968  4 Sheets-Sheet 2

INVENTOR
Borge Richard Ankersen

United States Patent Office 3,482,533
Patented Dec. 9, 1969

3,482,533
INCINERATORS
Borge Richard Ankersen, Pontiac, Mich.
Continuation-in-part of application Ser. No. 636,788,
May 8, 1967. This application June 28, 1968, Ser. No. 741,044
Int. Cl. F23g 3/02, 5/08; F23c 9/04
U.S. Cl. 110—8                                          4 Claims

ABSTRACT OF THE DISCLOSURE

An incineration apparatus is provided including a main combustion chamber, a secondary combustion chamber connected thereto, means for feeding high calorific fuel and preheated air into said main combustion chamber, said secondary combustion chamber receiving products of combustion from the main combustion chamber, a heat exchanger connected to said secondary combustion chamber and receiving products of combustion therefrom and a gas cleaning section connected to and receiving gaseous materials from the heat exchanger and removing particulate material.

---

This application is a continuation-in-part of my copending application Ser. No. 636,788 filed May 8, 1967.

This invention relates to incinerators and particularly to a high temperature cyclonic action incinerator assembly capable of handling refuse of a broad size range and of recovering the heat energy as steam.

The disposal of garbage and refuse, particularly in larger urban areas, has become one of the prime problems in this country. Land fills are unsightly, unclean and breeders of vermin of all sorts. Ordinary methods of incineration do not do a satisfactory job and leave a substantial portion of garbage unburned as well as discharging odors, ash and dirt from the stack and furnace.

I have invented an incineration apparatus and based upon the concept of reducing the garbage and refuse to a generally uniform size consisting of injecting the reduced garbage and refuse in cyclonic fashion with preheated air into a high temperature main combustion chamber while selectively feeding a high calorific fuel into a primary combustion chamber beneath the main chamber, delivering the products of combustion from the primary and main combustion chambers through a reduced orifice into a secondary combustion chamber, delivering the products of combustion from said secondary combustion chamber through a venturi into a heat exchanger, removing the heat from said products of combustion in said heat exchanger, and passing the cooled gases through a gas cleaner to remove residual particulate matter. Preferably I feed proportioned amounts of wet and dry garbage and refuse into the main combustion chamber.

Preferably I provide at least one main combustion chamber in the form of a cylinder converging downward into an inverted cone having an open apex, a fire box or primary combustion chamber beneath the main combustion chamber and connected thereto through said open apex, means for feeding a high calorific fuel to said primary combustion chamber, means for selectively introducing preheated air under pressure into the open apex, means for introducing refuse to be incinerated and preheated air tangentially at the top of the main combustion chamber, a secondary combustion chamber in the form of a cone extending upward from the top of the main combustion chamber axially thereof receiving the products of combustion carrying in suspension residual ash particles and unburned particles for further combustion. The apex of this cone section forms the throat section of a ventrui tube superimposed above and connected to the secondary combustion chamber receiving the final products of combustion and discharging these into a heat exchanger section to extract the heat therefrom, and a gas cleaner section receives the gaseous materials from the heat exchanger section for removing traces of particulate material.

Preferably I provide a refuse receiving station adjacent the furnace, a shredder means receiving refuse from the receiving station to shred the same, a source of high pressure fluidizing air delivering air to a shredded refuse delivery system, a shredded refuse storage area and connections from the shredded refuse storage area and the shredded means to the means for introducing refuse to the main combustion chamber. Preferably, the bottom of the primary combustion chamber is mounted on wheels for movement into and out of position beneath the main combustion chamber and is provided with a slag discharge spout delivering molten residue from the primary combustion chamber to an adjacent quench tank.

In the foregoing general statement of my invention, I have outlined certain objects, purposes and advantages of my invention. Other objects, purposes and advantages will be apparent from a consideration of the following description and the accompanying drawings in which.

Figure 1:
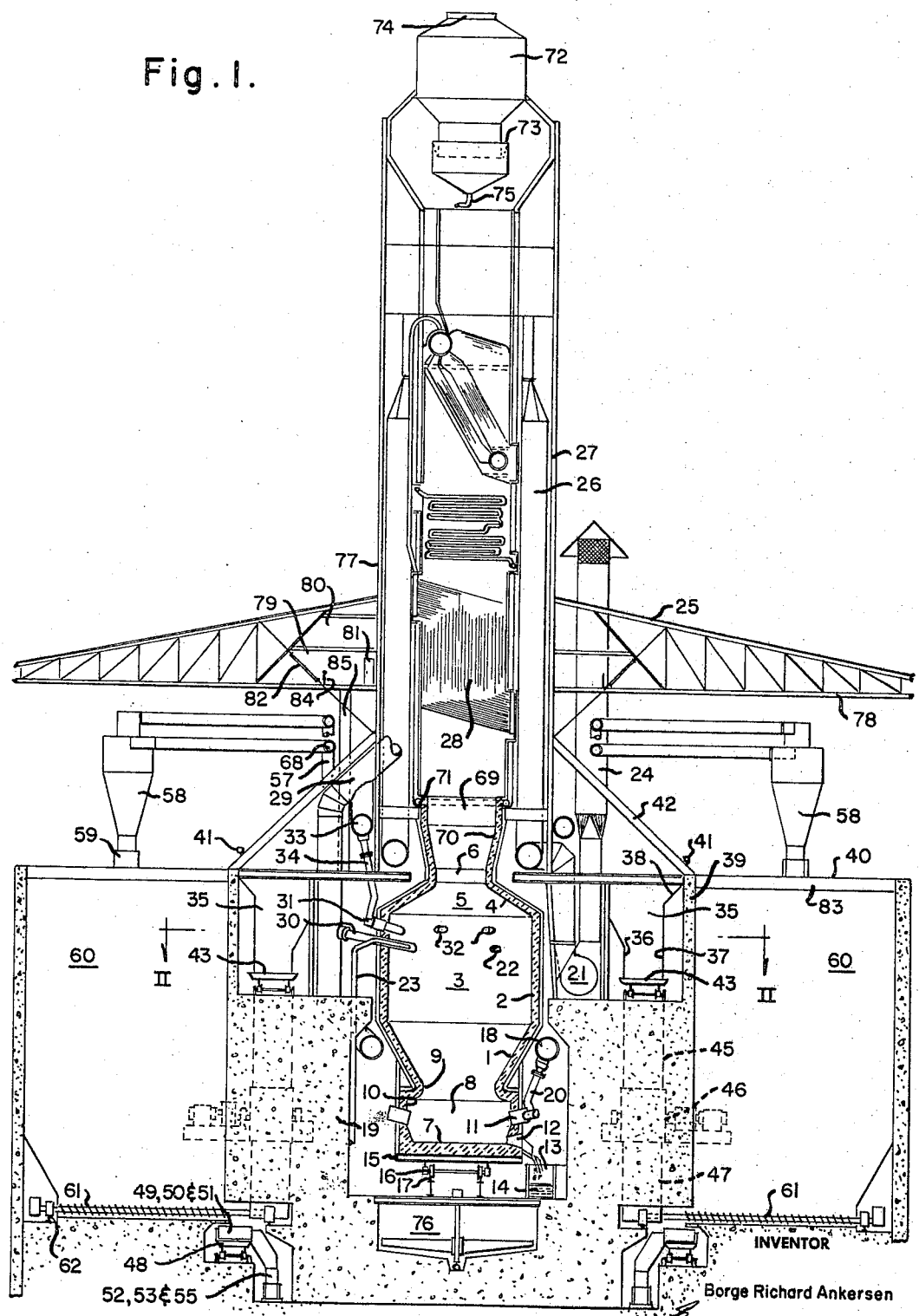
FIGURE 1 is a vertical section through an incinerating plant according to my invention.

Referring to the drawings I have illustrated an incinerating plant which comprises a cone-shaped refractory hearth 1 and cylindrical walls 2 surrounding a main combustion chamber 3 within the volume of which the major part of the combustion of the refuse takes place. Extending upward from the top of cylindrical walls 2 is a cone-shaped refractory lined roof 4 surrounding the secondary combustion chamber 5. At the top of the secondary combustion chamber, roof 4 terminates and extends into a throat opening 6 at its center.

Below the bottom of hearth 1 is a circular melting hearth 7 forming the bottom of a primary combustion chamber 8 joining at circular opening 9 the bottom apex of hearth 1. Primary combustion chamber 8 is surrounded by refractory lined walls 10 through which gas burners 11 are positioned for tangential firing downwardly into combustion chamber 8. The refractory lined bottom 7 of primary combustion chamber 8 collects the residue of the combustion process in the form of molten slag which is discharged through tap hole 12 into water filled quench tank 13. The slag is quenched and granulated and then removed by conveyor 14 to a waiting truck or the like. The bottom 7 of primary combustion chamber 8 is surrounded by a reinforced steel shell 15 and supported on railroad type wheels 16 riding on track 17 supported on the concrete floor of the pit to facilitate removal of the primary combustion chamber bottom 7 for maintenance and replacement by another identical bottom structure while maintenance is being performed away from the operating portion of the furnace. Circular piping manifold 18 is located within the concrete foundation 19 surrounding the furnace and is connected through piping 20 to provide a tangential high velocity preheated combustion air through the burner openings to the lower section of main combustion chamber 3 through circular top opening 9 of the primary combustion chamber. Four primary combustion air blowers 21 are located at the top of foundtion 19 and positioned to provide high velocity tangential injection of preheated combustion air assisting in carrying the shredded refuse to be burned within the furnace from discharge point 22 of materials carrying high pressure pneumatic line 23. Combustion air blower 21 receives clean outside air through intake ducts 24 extending vertically up through the plant roof 25. Combustion blower 21 discharges its air upward through ducts 26 located within the wall of stack 27. From duct 26 the air is passed through a steam recuperator and thereafter through a waste gas recuperator at the top of steam generator 28 for preheating. After being discharged from the waste gas recuperator the air is passed downward through preheated air ducts 29 through furnace inlet pipe 30 which concentrically surrounds pneumatic material carrying pipe 23 discharging tangentially into the main combustion chamber 3 of the furnace through inlet opening 22 at a high velocity the mixture of shredded refuse suspended in the proper amount of preheated air required for its complete combustion. Gas burners 31 are positioned to fire tangentially into the upper part of main combustion chamber 3 through burner openings 32 located immediately above shredded refuse injection opening 22. Burners 31 are provided with preheated air from circular manifold 33 through pipe 34. Surrounding the furnace is an annular receiving hopper 35 defined by inner cylindrical steel wall 36 and outer cylindrical steel wall 37. The upper part of cyindrical wall 37 is flared outwardly by conical upper section 38 to coincide with the inside diameter of the pit opening and the outer concrete foundation 39 on top of which is the operating floor 40. Trucks arrive on operating floor 40 and back up against the steel bumper 41 supported between structural steel braces 42. At the bottom of the receiving hopper 35 is a rotary turn table conveyor 43 carrying the received material to tangential discharge guide 44 which guides the refuse over inclined chute 45 into hammermill 46. Below the discharge chute 47 of hammermill 46 is located rotary table feeder 48 which carries the shredded material to plows 49, 50 and 51. Plows 49 and 50 guide the shredded material into pneumatic air feeders 52 and 53 which feed the material into pneumatic lines 23 carrying the material to inlet openings 22 to the main combustion chamber 3 of the furnace. High pressure pneumatic air pumps 54 deliver the air required to rotary feeders 52 and 53 for carrying the material through lines 23. Plow 51 guides the shredded material into rotary feeder 55 which feeds the material into air line 57 through which blower 56 provides air to carry the material to cyclone collectors 58 from which it is discharged through rotary feeder 59 into storage area 60. At the bottom of storage area 60 is located screw unloader 61 which is supported on wheels 62 and 63 and arranged to rotate in bearings 66 and 67 driven by electric motor 65 through gear box 64. Above throat 6 the products of combustion from the top of the furnace expand into venturi discharge section 69 surrounded by inverted cone shaped refractory lined walls 70 terminating in boiler support structure 71 near the base of stack 27. Within stack 27 is located high pressure steam boiler 28 above the top of which is suspended within the confines of the stack structure the high efficiency flue gas scrubber 72 with flue gas inlet 73 and discharge opening for flue gases 74. At the bottom point of scrubber 72 is discharge pipe 75 for the discharge of fly ash contaminated water which is piped directly to slurry tank 76 at the bottom of the concrete foundation. The stack structure is surrounded by stack columns 77 which are supported at the bottom by braces 42. A circular roof 25 covers the entire operating area of the plant and is supported by roof trusses 78 which are carried by stack columns 77 around the stack.

Within the roof trusses are located a circular shaped control room 79 and administration offices 80. Control panels 81 mounted on the inner circular wall of control room 79 contain all electronic instrumentation for the operation of the plant. Occupying the entire outer wall of the control room are large windows 82 providing the operators of the plant with a full and unobstructed view of all of the activities on the operating floor 40 below. Recessed into the surface of operating floor 40 are twenty truck scales 83 reaching out radially from the outer edge of receiving hopper 35. Preventing the operators from inadvertently walking into windows 82 is guard rail 84. Elevator 85 leads from the operating floor 40 to control rooms 79 and administration offices 80.

Under operating conditions trucks carrying refuse to the plant will arrive on the operating floor 40 in which scales 83 are located. The trucks back in on the scales until the rear wheel of the truck touches the bumper 41. It will then dump its load into receiving hopper 35 and turntable 43 being in continuous rotating motion, will carry the discharged load circumferentially around within the hopper sides 36 and 37 to the point of tangential discharge. At this point, outer wall 37 of the hopper does not follow its otherwise cylindrical shape, but has a straight section extending tangentially to the intake opening of a large hammermill type shredder 46. Directly opposing the tangential position of side 37 is a vertical tangential discharge guide 44 which prevents the burden of refuse on turntable 43 from being carried on around on its rotating path. When the burden reaches discharge guide 44, it is guided into the intake chute 45 of the hammermill and is shredded to small pieces. Upon being discharged through the bottom chute of the hammermill, the shredded material is delivered to a high speed rotary turntable feeder 48 which carries the material along its circular path to plows 49, 50 and 51. Immediately above the surface of the turntable feeder is arranged a magnetic separator and discharge belt conveyor by means of which all iron parts are removed from the shredded material on the turntable and conveyed to trucks on the operating floor of the plant. The combustion capacity of the furnace is approximately 100 tons per hour of average municipal refuse. Since it is the aim of the plant to destroy all garbage containing material as fast as it is received from the trucks on the operating floor the two rotary feeders 52 and 53 are each arranged to handle 50 tons per hour for the delivery into the furnace. Since there are great variations in the rate at which materials are received on the operating floor, the rate of material discharge from the hammermills are also subjected to large variations. In order to always be able to provide the proper rate of feed of materials into the feeders 52 and 53, the plows 49 and 50 are adjustable in a vertical direction to control the depth at which they are cutting into the bed of material carried by the rotary turntable. If more material is being carried by the turntable than is required to satisfy the proper needs of feeders 52 and 53, the excess amount of material will be passed on to plow 51 and fed into feeder 55 from where it will be fed into storage area 60 through one of the cyclone collectors 58. When material is thus fed to storage through pneumatic material feed lines 57, the material will first be carried to the most distant cyclone 58 in the storage system. When the storage volume below this cyclone has been completely filled a control gate 68 will be operated to guide the material flow into the second cyclone in line and by operating the control gate 68 in the air line in this manner successively from one end to the other of the storage area, the entire area will be efficiently filled. If the material flow through the shredder 46 should decrease to the point where it is insufficient to maintain the combustion needs of the furnace, the screw unloader 61 located at the bottom of the storage area will automatically be started to operate, feeding the stored material onto the rotary turntable feeder from which it will follow its normal course of progress past the plows into the rotary air feeders and through the pneumatic feed lines 23 into the furnace at the desired rates. All material received at the plant which does not contain any garbage and therefore will not rot or smell is discharged from the shredder 46 onto the high speed rotary turntable feeder 48. If at a particular moment of the day a sufficient amount of garbage containing material is received through the opposite shredder to maintain the combustion needs of the furnace then the dry shredded materials which do not contain garbage will by pass the two rotary air feeders feeding the material to the furnace by means of raising those respective plows above the top of the material burden on the turntable feeder. This will permit all of this dry shredded material to be discharged by the third plow on that half of the turntable guiding all of the material into the pneumatic feeding system carrying it to the storage area. If at any time during the day or night the feed rate of the garbage containing material should drop below the requirements of the furnace, then the screw unloader 61 will automatically begin to feed dry shredded material onto the turntable to provide the proper addition of material to satisfy the fuel needs of the furnace.

At the point of injection into the combustion chamber 3, the shredded material is carried around along the inside surface of refractory lined hearth 1 at a very high tangential velocity by the exact amount of air required for its perfect combustion. Due to its high angular velocity and its resulting centrifugal force acting on all of the unburned particles of the fuel, these particles will be forced against the very hot sidewalls of hearth 1 and those of the particles which are not combustible will melt and proceed to run down the steep incline of the refractory to melting hearth 7 below. At this point heavier pieces of combustible material will burn leaving the incombustible residue at the same point together with glass and various metallics which will melt together and collect on bottom hearth 7 as a molten slag which will then discharge through tap hole 12 into quench tank 13. As the stream of molten slag enters the water in the quench tank 12, the slag will suddenly solidify and shatter into small granular pieces which are then conveyed on a continuous basis out of quench tank 13 by conveyor 14 at the discharge point of which conventional conveyor means will bring the slag to a waiting truck or other means of disposal above on the operating floor. Gas burners 11 are positioned in the refractory wall of primary combustion chamber 8 so as to introduce tangentially a high velocity, high temperature flame into the primary combustion chamber. These burners are connected to conventional combustion blower valves and other safety equipment to provide an independent self-contained combustion system for providing an accurately controlled high temperature at between 2800° F. and 3000° F. within the primary combustion chamber 8. As a result of the high angular velocity within this combustion chamber, the high temperature products of combustion issuing upward through circular opening 9 into main combustion chamber 3 will tend to follow the contour of main hearth 1 thereby providing direct contact with the incoming unburned material for immediate ignition and stability of perfect combustion. Depending on the amount of heavier materials accumulating on melting hearth 7 due to the force of gravity in the furnace, manifold 18 will provide accurately controlled varying amounts of preheated combustion air tangentially injected at a very high velocity through burners. As the refuse laden primary combustion air spins around within main combustion chamber 3 following the contour of cylindrical wall 2 and main hearth 1, gravity will force the particulate matter in this air stream down toward hearth 7 in a downward spiralling motion. The clean, hot products of combustion will converge at the lower edge of hearth 1 and then move toward the center to form a small diameter, upward spiralling pattern emerging upward through throat 6 through expanding venturi section 69 where it will distribute itself under the intake area of high pressure boiler 28. Very light products of combustion formed immediately after the entrance of the material through opening 22 into main combustion chamber 3 will, due to the very intense heat in this area, tend to rise up into secondary combustion zone 5. Due to the high velocity swirling motion of these gases, particulate matter in this area will be centrifugally precipitated on cylindrical vertical walls 2, where, due to the high temperature, they will form molten slag which will run down wall 2, hearth 1, and proceed, together with the slag formed on the hearth, toward the bottom of the furnace and discharge point 12.

Flue gases emerging from throat section 6 at between 2500° and 2900° will proceed up through the heat exchange or boiler section 28 where the heat energy will be extracted so that, at the point of discharge at the top of the boiler, the flue gases will emerge at approximately 600° F. At this point, the flue gases will be forced through intake annulus 73 at the bottom of high efficiency scrubber 72 within which they will be cleaned of practically all contaminants and particulate matter and then will be exhausted through discharge opening 74 with a dust loading of less than .2 pound of particulate matter per 1,000 pounds of flue gas discharged.

The controlling operation of the entire plant is performed by a multitude of electronically controlled instruments 81 and associated equipment located in the control room 79 within the roof structure above the operating floor. An electronic computer located here will automatically control the operation of all the blowers, air valves, gas valves, material feed rates of various kinds of materials required to maintain a steady optimum level of combustion within the furnace and operation of the steam boiler and associated equipment. The twenty truck scales 83 which are built into the surface of the operating floor 40 are all electronically operated scales, the operation of which are controlled by the computer in the operating room. Four operators in the control room each control the operation of five scales keeping track of which materials are discharged into the receiving hopper and by remote control removing explosives or other undesirable items from being fed into the shredder. Elevator 85 provide access and egress from the control room and offices located within the roof structure.

Figure 2:
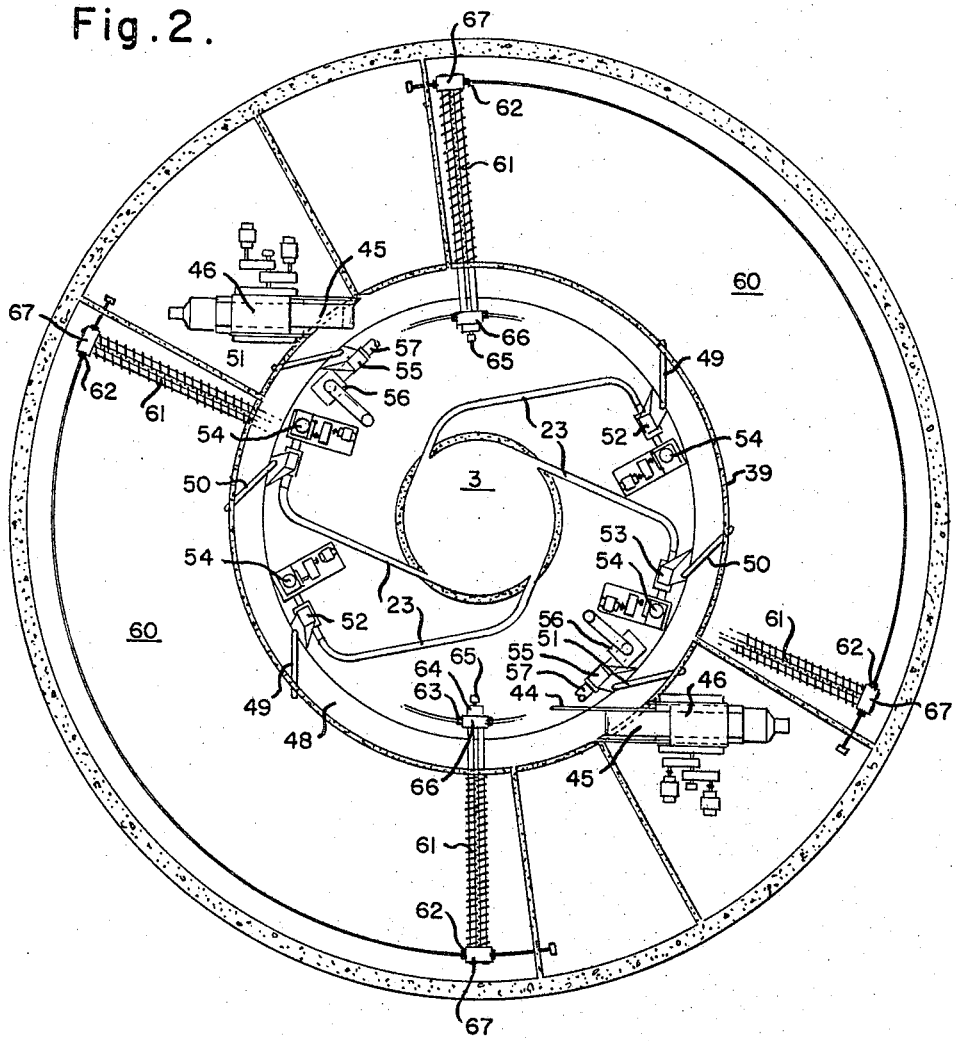
FIGURE 2 is a section on the line II—II of FIGURE 1.
Figure 3:
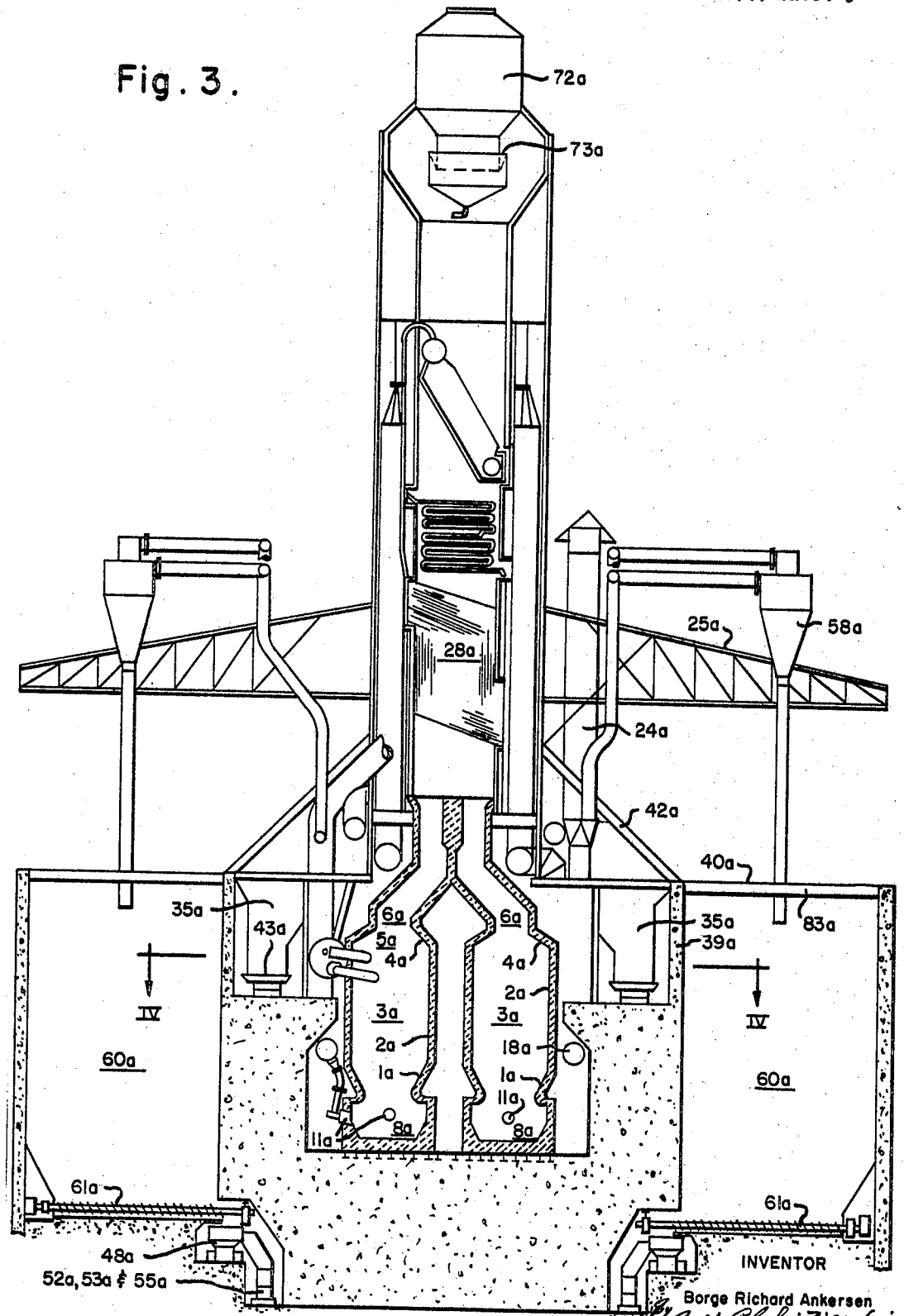
FIGURE 3 is a vertical section through an incinerating plant according to a second embodiment of my invention.
Figure 4:
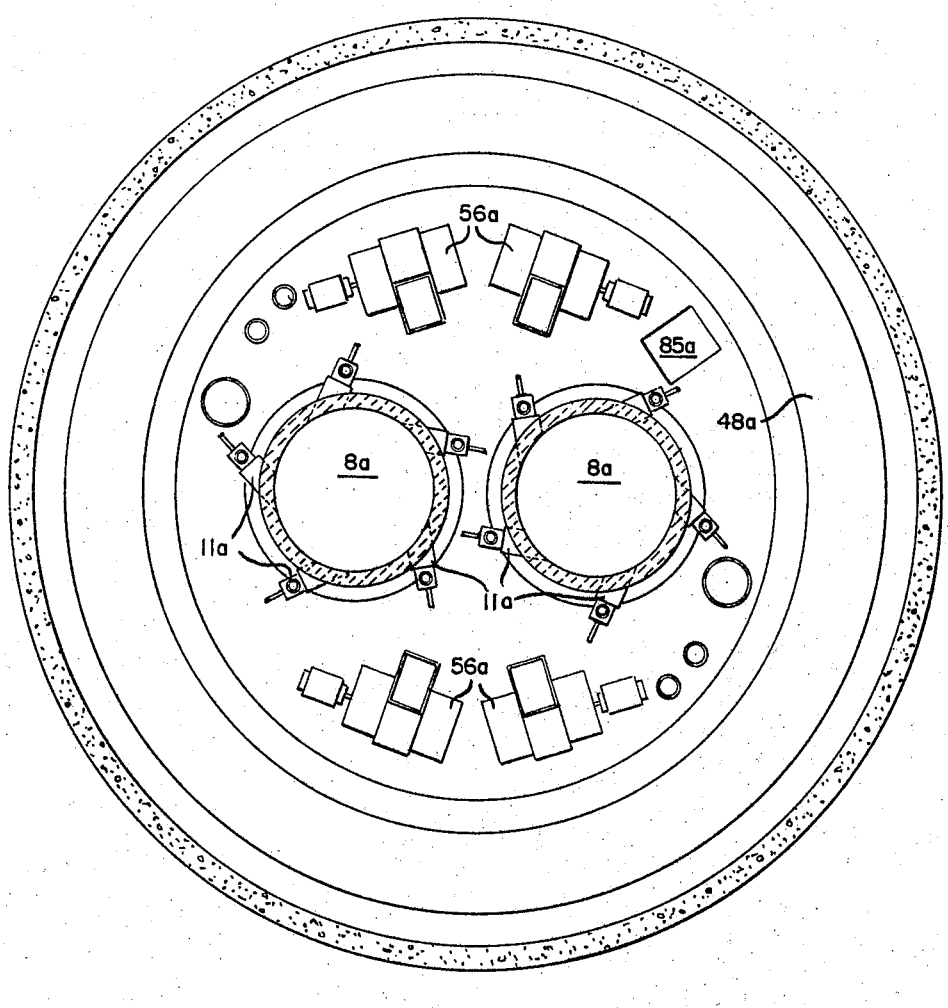
FIGURE 4 is a section on the line IV—IV of FIGURE 3.

In the embodiment shown in FIGURES 3 and 4 I have illustrated a duplex furnace arrangement based upon the use of side-by-side main combustion chambers 3a surrounded by cylindrical walls 2a and having a cone-shaped refractory hearth 1a precisely as in FIGURES 1 and 2. Extending upwardly from the top of each wall 2a is a cone-shaped refractory lined roof 4a surrounding a secondary combustion chamber 5a terminating in a refractory throat opening 6a. Each such throat 6a discharges into one arm of a bifurcated venturi chamber. Each combustion chamber 3a is connected at the bottom to a primary combustion chamber 8a precisely as described in connection with FIGURES 1 and 2 and bearing the same identifying numerals with the suffix a. All of the accessory portions of the embodiment of FIGURES 3 and 4 are identical with those of FIGURES 1 and 2 and bear the same numbers with the suffix a. The operation of the embodiment of FIGURES 3 and 4 is precisely the same as that of FIGURES 1 and 2 excepting that there are two combustion chamber assemblies which are independently operable.

I claim:

1. An incineration apparatus comprising at least one main combustion chamber in the form of a cylinder converging downwardly into an inverted cone having an open apex, a primary combustion chamber beneath the main combustion chamber and connected thereto through said open apex, means for feeding a high calorific fuel to said primary combustion chamber, means for introducing selectively preheated air under pressure into said apex, means for introducing refuse to be incinerated together with preheated air tangentially into the main combustion chamber intermediate its ends, a secondary combustion chamber in the form of a cone extending upwardly from the main combustion chamber receiving the products of combustion, the apex of said cone forming the throat section of a venturi superimposed above and connected to said secondary combustion chamber receiving the final products of combustion and discharging the same, an adjacent heat exchanger section connected to said venturi and a gas cleaner section receiving the gaseous materials from the heat exchanger section and removing particulate material.

2. An incineration apparatus as claimed in claim 1 having a refuse receiving station adjacent the furnace, shredder means receiving refuse from said receiving station and reducing the same to a selected size range, a source of high pressure air, a shredded refuse delivery system connecting said source of high pressure air and said shredder means to said means for introducing refuse to the main combustion chamber.

3. An incineration apparatus as claimed in claim 1 wherein the primary combustion chamber is provided with a bottom mounted on wheels for movement into and out of position beneath the said combustion chamber and slag discharge spout means on said bottom delivering molten residue from the primary combustion chamber and quench means adjacent said bottom receiving the molten residue from said spout means.

4. An incineration apparatus comprising a main combustion chamber, a secondary combustion chamber connected thereto, means for feeding high calorific fuel into said main combustion chamber, means for introducing refuse to be incinerated and preheated air tangentially into said main combustion chamber, said secondary combustion chamber receiving products of combustion from the main combustion chamber, a heat exchanger connected to said secondary combustion chamber and receiving products of combustion therefrom and a gas cleaning section connected to and receiving gaseous materials from the heat exchanger and removing particulate material.

References Cited

UNITED STATES PATENTS

| | | |
|---|---|---|
| 2,171,535 | 9/1939 | Berg et al. |
| 2,592,491 | 4/1952 | Toepel. |
| 2,869,487 | 1/1959 | Sherman. |
| 3,050,202 | 8/1962 | Funk _____ 110—7 |
| 3,180,289 | 4/1965 | Steinert. |
| 3,286,666 | 11/1966 | Ohlsson. |

KENNETH W. SPRAGUE, Primary Examiner

U.S. Cl. X.R.

110—18, 28